United States Patent [19]
Yeung et al.

[11] Patent Number: 5,835,496
[45] Date of Patent: Nov. 10, 1998

[54] METHOD AND APPARATUS FOR DATA ALIGNMENT

[75] Inventors: Clifford Yeung, Richmond Hill; Nandakumar Natarajan, Scarborough, both of Canada

[73] Assignee: McData Corporation, Broomfield, Colo.

[21] Appl. No.: 640,296

[22] Filed: Apr. 30, 1996

[51] Int. Cl.[6] .................................................. H04J 3/06
[52] U.S. Cl. .......................... 370/514; 370/516; 375/365
[58] Field of Search .................................... 370/514, 503, 370/507, 509, 510, 511, 512, 513, 520, 463, 464, 466, 498, 420, 216, 516, 515; 375/356, 359, 362, 363, 364, 365, 368, 366, 367, 357, 371; 395/200.01, 200.02, 200.12, 200.13, 200.14, 200.17, 200.21, 200.19, 200.2, 200.31, 200.66, 200.67, 200.78, 200.8, 200.81

[56] References Cited

U.S. PATENT DOCUMENTS 5,068,880  11/1991  Kline et al. .............................. 370/514
5,535,373  7/1996  Olnowich .................................. 370/666
5,638,518  6/1997  Malladi ................................. 395/200.21
5,648,776  7/1997  Widmer ..................................... 370/498

OTHER PUBLICATIONS

Dan McCarthy et al., "GLM Family", FCSI–301–Revision 1.0, pp. 1–34 publ. Feb. 16, 1994, IBM, et al.
HP/IBM, "Fibre Channel News Aug.–Sep. 1994", Sep. 1994, http://www1.cern.ch/HSI/fcs/news/augsep94.htm, CERN, Switzerland.
Kumar Malavalli & Bent Stoevhase; "Distributed Computing With Fibre Channel Fabric", Canstar, 3900 Victoria Park Ave., N.York, Ontario, Canada; Publication Date :Feb. 24, 1992, Institute of Electrical and Electronics Engineers, Inc. –Digest of Papers—Spring Compcon 92.

*Primary Examiner*—Huy D. Vu
*Attorney, Agent, or Firm*—William J. Kubida, Esq.; Stuart T. Langley, Esq.; Holland & Hart LLP

[57] ABSTRACT

A method and apparatus for the synchronization of an F_port receiver on a Fibre Channel switch with an external N_port to ensure the reception of a stream of transmission characters including four byte ordered sets having a comma character positioned as the left most byte in the ordered set in accordance with the Fibre Channel standard.

13 Claims, 5 Drawing Sheets

METHOD AND APPARATUS FOR DATA ALIGNMENT

FIELD OF THE INVENTION

The present invention relates to a method and apparatus for the synchronization of an F_port receiver on a Fibre Channel switch with an external N_port to ensure the reception of a stream of transmission characters including four byte ordered sets having a comma character positioned as the left most byte in the ordered set.

BACKGROUND OF THE INVENTION

Mainframes, super computers, mass storage systems, workstations and very high resolution display subsystems are frequently connected together to facilitate file and print sharing. Common networks and channels used for these types of connections oftentimes introduce communications bottle necking, especially in cases where the data is in a large file format typical of graphically-based applications.

There are two basic types of data communications connections between processors, and between a processor and peripherals. A "channel" provides a direct or switched point-to-point connection between communicating devices. The channel's primary task is merely to transport data at the highest possible data rate with the least amount of delay. Channels typically perform simple error correction in hardware. A "network," by contrast, is an aggregation of distributed nodes (e.g., workstations, mass storage units) with its own protocol that supports interaction among these nodes. Typically, each node contends for the transmission medium, and each node must be capable of recognizing error conditions on the network and must provide the error management required to recover from the error conditions One type of communications interconnect that has been developed is Fibre Channel. The Fibre channel protocol was developed and adopted as the American National Standard for Information Systems (ANSI). See *Fibre Channel Physical and Signaling Interface* (FC-PH), Revision 4.3, American National Standard for Information Systems (ANSI) (1994) for a detailed discussion of the fibre channel standard. Briefly, fibre channel is a switched protocol that allows concurrent communication among workstations, super computers and various peripherals. The total network bandwidth provided by fibre channel is on the order of a terabit per second. Fibre channel is capable of transmitting data at rates exceeding 1 gigabit per second in both directions simultaneously. It is also able to transport commands and data according to existing protocols such as Internet protocol (IP), small computer system interface (SCSI), high performance parallel interface (HIPPI) and intelligent peripheral interface (IPI) over both optical fiber and copper cable.

Essentially, the fibre channel is a channel-network hybrid, containing enough network features to provide the needed connectivity, distance and protocol multiplexing, and enough channel features to retain simplicity, repeatable performance and reliable delivery. Fibre channel allows for an active, intelligent interconnection scheme, known as a "fabric," or fibre channel switch to connect devices. The fabric includes a plurality of fabric-ports (F_ports) that provide for interconnection and data transfer between a plurality of node-ports (N_ports) attached to associated devices that may include workstations, super computers and/or peripherals. The fabric has the capability of routing data based upon information contained within the data. The N_port manages the simple point-to-point connection between itself and the fabric. The type of N_port and associated device dictates the rate that the N_port transmits and receives data to and from the fabric. Transmission is isolated from the control protocol so that different topologies (e.g., point-to-point links, rings, cross point switches) can be implemented.

Synchronization of the receiving F_port on the Fiber Channel switch with the transmitting N_port is required to ensure that a steady stream of transmission characters is received by the F_port prior to decoding of the transmission characters for forwarding to another F_port on the Fiber Channel switch.

Comma Characters

Each F_port of a Fibre Channel switch includes a receiver for receiving transmission characters that may include four byte ordered sets having a comma character. Comma characters are special transmission characters having a specific 10-bit (byte) character string that may be employed for aligning the stream of transmission characters such that the F_port receiver is synchronized with the N_port. An ordered set is a four byte set of transmission characters in which the left most byte is a comma character (a comma character includes either the seven bit sequence "0011111" or "1100000" in bit positions [9-3]).

Proper operation of the Fibre Channel switch requires that the receiver is synchronized with the transmitting N_port to ensure that a regular stream of transmission characters, including ordered sets having a comma character at the left most byte position, are received and decoded for transmission to other ports on the Fibre Channel switch.

Thus, it would be advantageous to maintain receiver synchronization by detecting for the presence and location of a comma character, and if the comma character is not in the left most byte position, shifting the position of the comma character, and ensuring that excessive comma characters are masked out.

Thus, a heretofore unaddressed need exists in the industry for new and improved systems for aligning transmission characters received by an F_port prior to being forwarded through the Fibre Channel switch. Particularly, there is a significant need for a method and apparatus for detecting comma characters within the stream of transmission characters and for ensuring that only one comma character resides with an ordered set and that the comma character is properly aligned as the left most byte in the ordered set.

The invention advantageously provides for a regular pattern of comma characters located only at the left most byte of each ordered set by aligning incorrectly placed comma characters and for masking out excessive comma characters without interrupting the flow of transmission characters.

SUMMARY OF THE INVENTION

The present invention is a method and apparatus for the synchronization of a receiver located on an F_port of a Fibre Channel switch with an external N_port to ensure the reception of transmission characters including four byte ordered sets having a comma character positioned as the left most byte in the ordered set. The comma character is a special transmission character having a specific 10-bit (byte) character string (a comma character includes either the seven bit sequence "0011111" or "1100000" in bit positions [9-3]). An ordered set consists of four bytes of transmission characters in which the left most byte is a comma character.

The receiver is synchronized when it receives a steady stream of transmission characters including at least three ordered sets in a row without any interposed invalid transmission words. Detection circuity locates comma characters within the data stream and an alignment circuitry shifts their position such that each port receives a regular pattern of comma characters located as the left most byte of an ordered set, and for ensuring that excessive comma characters are masked out.

The detection circuitry further comprises a comma detector for ascertaining the presence of a comma character, a four stage comma bank register and a four stage register bank, wherein, if the comma detector detects the presence of a comma character, a one-bit flag is passed along to the four stage Comma bank register, and the 10-bit transmission character is passed onto the four stage register bank.

The alignment circuitry comprises a comma bank multiplexer for receiving the four outputs of comma bank register, a register bank multiplexer for receiving the four outputs of the register bank, and control logic synchronized by a clock enable generated from a system synchronization pulse, wherein the control logic ascertains whether the F_port receiver is synchronized with the N_port. If the receiver is not synchronized and only one comma character is identified, the control logic provides a datapath select pulse to latch onto the comma bank multiplexer and the register bank multiplexer to select the comma character within the register bank to position it as the left most byte in the ordered set.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENTS

Figure 1:
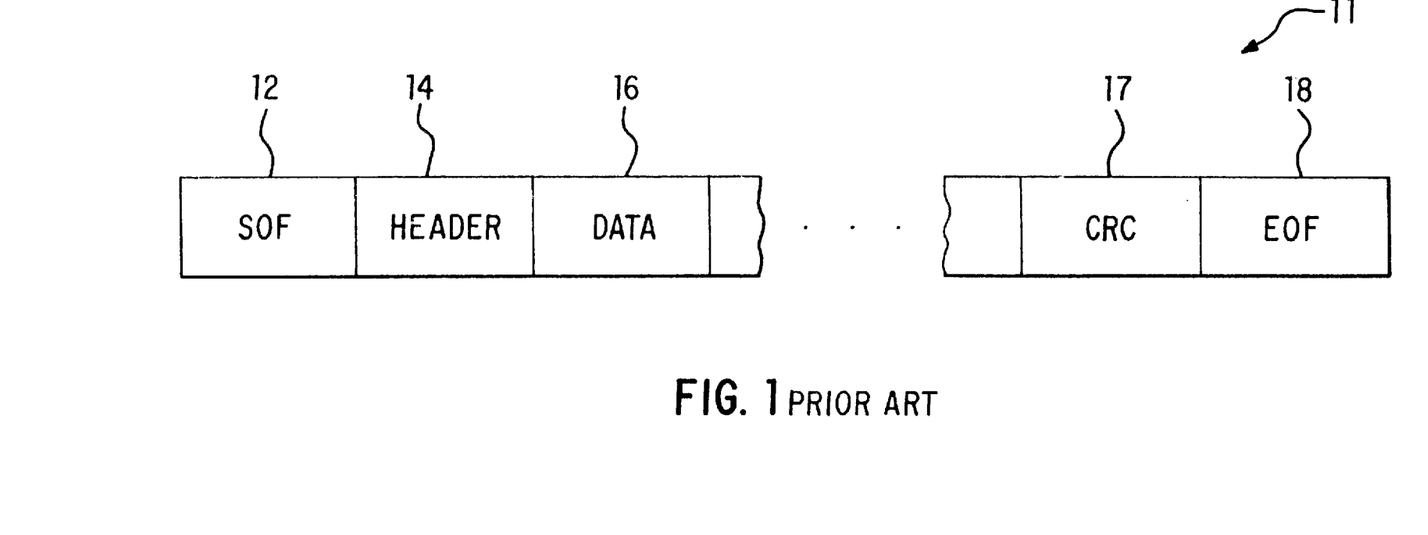
FIG. 1 is a schematic diagram of a prior art variable-length frame communicated through a fiber optic network in accordance with the Fibre Channel industry standard.

With reference now to the drawings wherein like reference numerals designate corresponding parts throughout the several views. A variable-length frame 11 is illustrated in FIG. 1. The variable-length frame 11 comprises a 4-byte start-of-frame (SOF) indicator 12, which is a particular binary sequence indicative of the beginning of the frame 11. The SOF indicator 12 is followed by a 24-byte header 14, which generally specifies, among other things, the frame source address and destination address as well as whether the frame 11 is either control information or actual data. The header 14 is followed by a field of variable-length data 16. The length of the data 16 is 0 to 2112 bytes. The data 16 is followed successively by a 4-byte CRC (cyclical redundancy check) code 17 for error detection, and by a 4 byte end-of-frame (EOF) indicator 18. The frame 11 of FIG. 1 is much more flexible than a fixed frame and provides for higher performance by accommodating the specific needs of specific applications.

Figure 2:
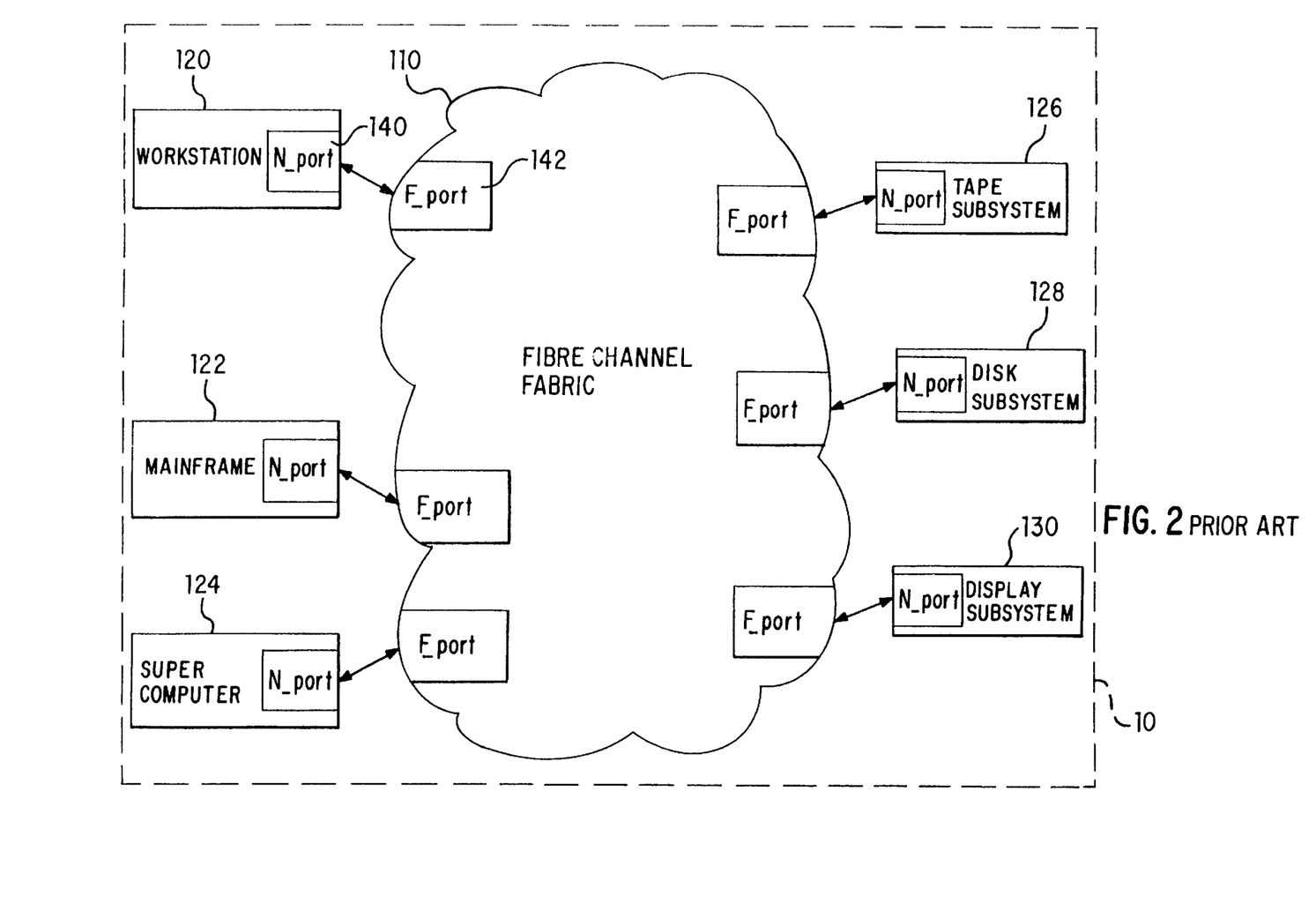
FIG. 2 shows a block diagram of a representative Fibre Channel architecture.

FIG. 2 illustrates a block diagram of a representative fibre channel architecture in a fibre channel network 100. A workstation 120, a mainframe 122 and a super computer 124 are interconnected with various subsystems (e.g., a tape subsystem 126, a disk subsystem 128, and a display subsystem 130) via a fibre channel fabric 110 (i.e. fibre channel switch). The fabric 110 is an entity that interconnects various node-ports (N_ports) and their associated workstations, mainframes and peripherals attached to the fabric 110 through the F_ports. The essential function of the fabric 110 is to receive frames of data from a source N_port and, using a first protocol, route the frames to a destination N_port. In a preferred embodiment, the first protocol is the fibre channel protocol.

Figure 3:
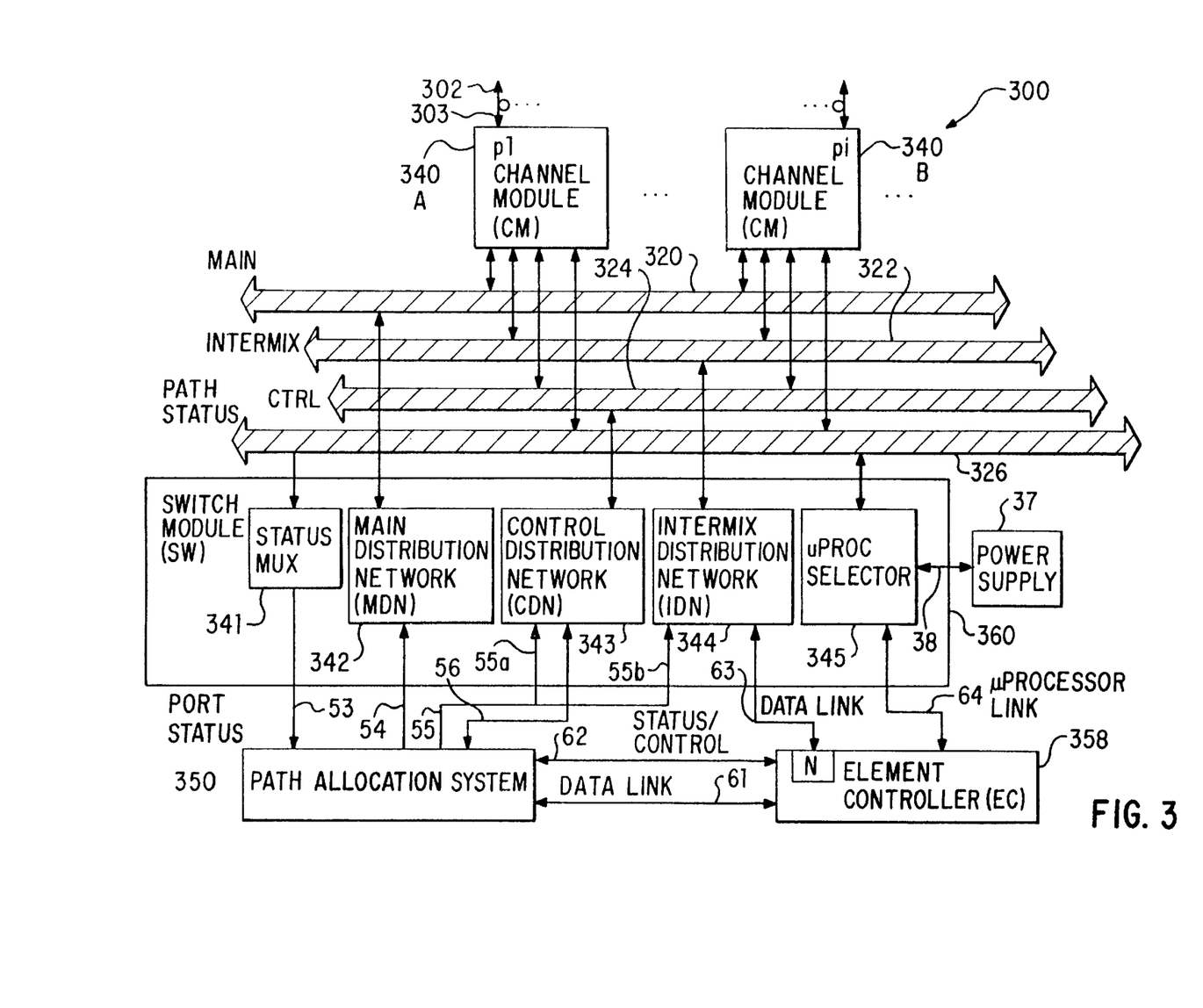
FIG. 3 is a schematic circuit diagram of the invention illustrating a high performance fiber optic switch constructed according to the present invention which utilizes a plurality of channel modules.

A fibre channel switch constructed in accordance with the invention illustrated in FIG. 3 includes a plurality of interconnected F_ports for efficiently routing frames between a plurality of N_ports on a fiber channel. Each F_port is coupled to a corresponding channel module comprising a plurality of receive buffer memories and associated state machines for tracking the contents of each buffer.

As used herein, these terms and phrases are defined as follows:

Class 1 service—a circuit-switched connection;
Class 2 service—a connection less, frame-switched link providing guaranteed delivery and receipt notification;
Class 3 service—a connection less service with no confirmation;
F_port—"fabric" port, the access point of the Fabric for physically connecting N_ports;
Fabric—a Fibre Channel-defined interconnection methodology that handles routing in Fibre Channel networks;
Frame—a linear set of transmitted bits that define a basic transport element;
Intermix—a class of service that provides functionality of both Class 1 and 2, Intermix reserves the full channel for a Class 1 connection while allowing Class 2 traffic to pass on unused bandwidth;
Link—a communications channel;
N_port—"node" port, a Fibre Channel-defined hardware entity at the node end of a link.

The fibre channel switch 300 illustrated in FIG. 3 employs a plurality of channel modules 340. The fibre channel switch has four (4) channel module cards, each containing four 266 Mbaud F_ports (providing for the interconnection of sixteen F_ports and associated computers and peripherals). Each channel module 340 is coupled directly to a main link 320, an intermix link 322, a control link 324 and a path status link 326. Control signals over the control link 324 direct the transfer of frames received by one channel module 340 to a different port on the same channel module or to any other available channel module 340. The channel modules 340 provide port intelligence for data communication with the channels, buffered receive memory for temporarily storing frames for class 2 and class 3 data transfers, as well as a bypass such that incoming frames are not buffered during class 1 data transfers. A path allocation system 350 communicates with the four channel modules 340 through a switch module 360.

For frame-switched traffic (class 2), the path allocation system 350 collects frame header information for each frame from the receiving ports channel module 340. The path allocation system 350 verifies the validity of the frame header information and allocates switch resources to set up a path for the frame, through the switch to the destination port. Once the frame has been forwarded, the path allocation system 350 de-allocates the switch resources.

The path allocation system 350 also collects frame header information for circuit switched traffic (Class 1 connect frames) from the channel modules 340. The path allocation system 350 then verifies the validity of the connection and allocates switch resources to set up a dedicated path for the connection to follow. The connection traffic itself will de-allocate resources.

Figure 4:
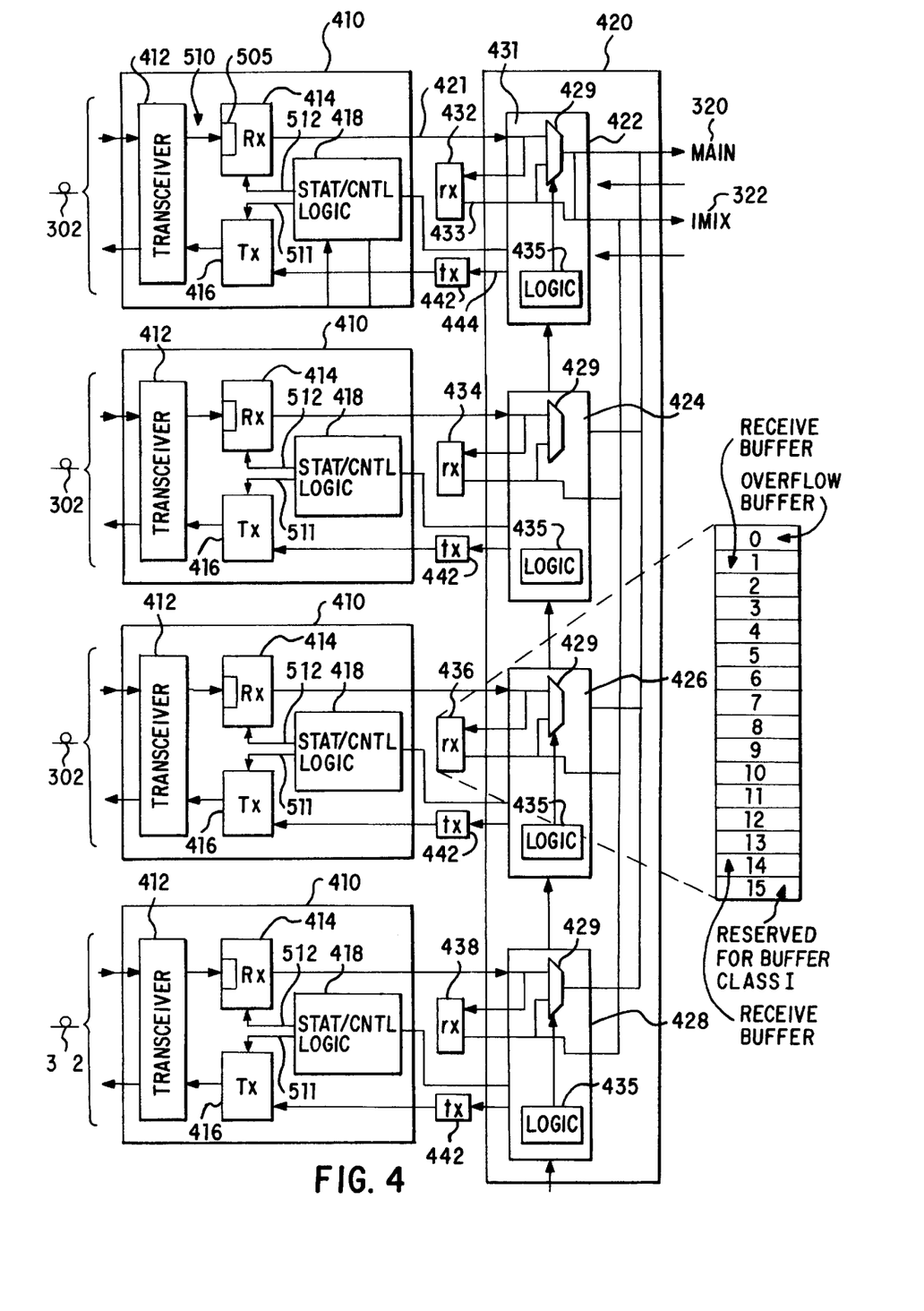
FIG. 4 shows a block diagram of one of the channel modules of FIG. 3 that includes a receiver as embodied in the invention.

FIG. 4 shows a block diagram of the channel module architecture for a quad port, 266 Mbaud channel module comprising four port intelligence systems 410 and a memory interface system 420 having four memory interfaces 422, 424, 426 and 428. Each port intelligence system 410 is coupled to external N_ports through a GLM/OLC (Gigabaud Link Module/Optical Link Card) transceiver 412. Incoming frames are transferred by the GLM/OLC transceiver 412 to a receiver 414. Status/control logic circuit 418 recognizes when a new frame is received by the receiver 414 and determines the transfer class (either 1 or 2) as well as the length of data from the received frame header information attached to the frame.

The receiver 414 is responsible for maintaining synchronization between the F_port and the attached N_port to ensure that a steady stream of transmission characters are received by the F_port. Additionally, the receiver 414 is responsible for decoding incoming transmission characters, managing buffer-to-buffer flow control; gathering statistics to evaluate link performance; re-timing the system clock; detecting, checking, and validating frames; and forwarding all frames to the memory interface system 420 for temporary storage in associated receive memory 432, 434, 436 and 438.

The memory interface system 420, in response to commands from the port intelligence system 410, employs the four memory interfaces 422, 424, 426 and 428 to interface four receive memories 432, 434, 436 and 438 (16k×16 external RAM) to internal switch data paths via the main bus 320 and imix bus 322. Frames transmitted across receive data path 421 between the port intelligence system 410 and the memory interface system 420 are bit sliced such that memory interface 422 receives bits 0–1, memory interface 424 receives bits 2–3, memory interface 426 receives bits 4–5 and memory interface 428 receives bits 6–7. Each memory interface knows its position and the baud rate at which the channel module 340 is operating. Frames read from receive memories 422, 424, 426 and 428 are reassembled to become byte-wide for traversing the fibre channel switch on the main bus 320 and imix bus 322.

A transmitter 416 is coupled between the memory interface system 420 and the GLM/OLC transceiver 412 and transmits frames that have been forwarded from other channel module receive memories within the fibre channel switch for encoding and transmission according to fibre channel rules. A 4k×9 FIFO transmit memory 442 is coupled between the memory interface 420 and the transmitter 416 for interfacing the main bus 320 and imix bus 322 to the port intelligence system 410. The memory interface 420 outputs bit-sliced data that is re-formed on the transmit data path 444 at the input of the transmit memory 442.

Each memory interface 422, 424, 426 and 428 includes a multiplexer 429 for providing class 1 data bypass via connection 431 and buffered storage for class 2 data transfers via connection 433 to the receive memory. Additionally, each memory interface includes a memory control logic 435 for controlling the multiplexers 429, the receive memories 432, 434, 436, 438 and the transmit memory 442 in response to commands from the port intelligence system 410 and the path allocation system 350 (FIG. 3).

Each port intelligence system 410 is coupled to external N_ports through a GLM/OLC transceiver 412. Incoming frames are transferred by the GLM/OLC transceiver 412 to the receiver 414. Status/control logic circuit 418 recognizes when a new frame is received by the receiver 414 and determines the transfer class (either 1 or 2) as well as the length of data from the received frame header information attached to the frame. The purposes of the receiver 414 are to: maintain synchronization with the attached N_port; decode incoming transmission characters, to manage buffer-to-buffer flow control; gather statistics to evaluate link performance; re-time the system clock; detect, check, and validate frames; and forward all frames to the memory interface system 420 for temporary storage in associated receive memory 432, 434, 436 and 438.

Operation of the Data Alignment Mechanism

As previously set forth with reference to FIG. 4, one of the responsibilities of the receiver 414 is to maintain word synchronization between the F_port and the attached N_port, thus ensuring the transmission and reception of a regular stream of transmission characters. In particular, optical signals from the N_port are transformed into a stream of transmission characters by the GLM/OLC transceiver 412 and input into the receiver 414. The GLM/OLC transceiver 412 generates an internal clock signal from the bit pattern in the stream of transmission characters. Noise caused by the transmission medium introduces errors that adversely affects the stream of transmission characters to cause synchronization problems. To effect synchronization, the N_port sends words having four bytes (10 bits/byte) defined as an ordered set. Each ordered set must include a comma character defined as a 10-bit transmission character containing (a seven bit sequence, either "0011111" or "1100000") followed by three additional bits, as the left most (first) byte of the four byte word.

Figure 5:
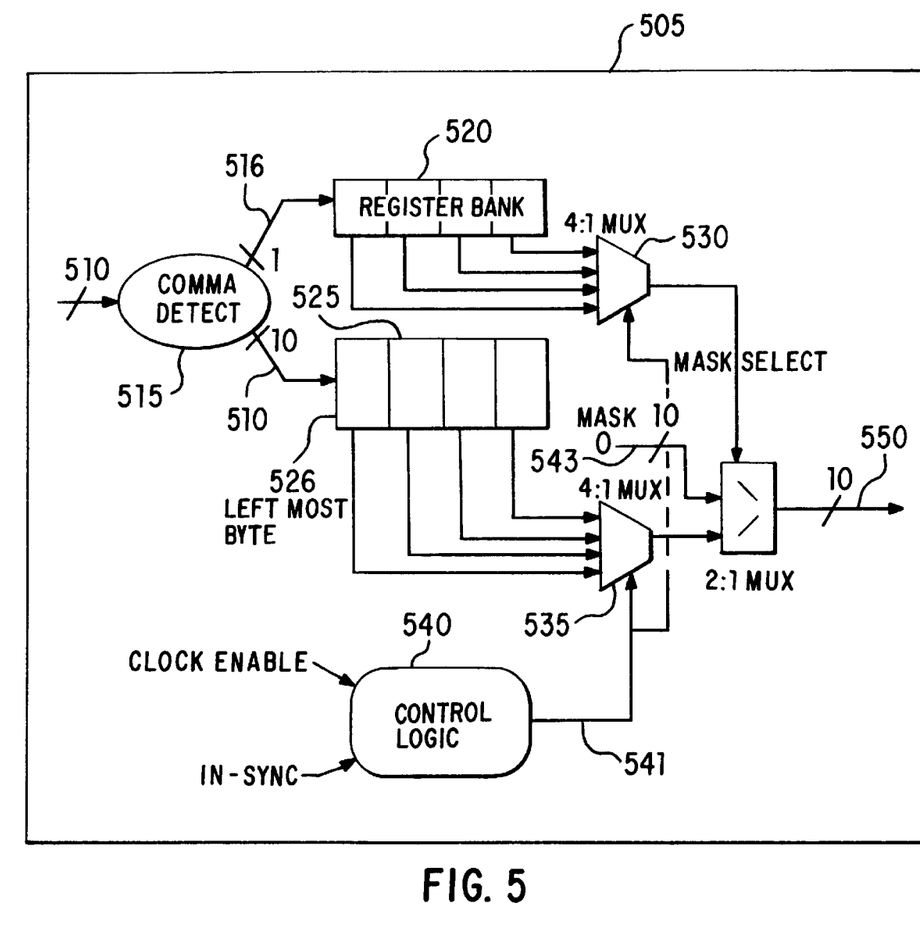
FIG. 5 shows a block diagram of a comma detection and alignment circuitry contained in the receiver as illustrated in FIG. 4.

Transmission characters forwarded from the N_port 140 are received by the F_port 142 (FIG. 2) through the GLM/OLC transceiver 412 (FIG. 4) as encoded 10-bit wide transmission characters 510 to the receiver 414. The receiver 414 includes a comma character alignment mechanism 505 for ensuring synchronization between the N_port 140 and the receiver 414. The 10-bit wide transmission characters 510 generated by the GLM/OLC transceiver 412 are input into comma detection circuitry 515 for determining if the input transmission characters contain a comma character. If present, then the detection circuitry 515 a generates a one-bit flag 516 and forwards it to a four stage comma presence register bank 520 and forwards the 10-bit transmission characters 510 onto a four stage transmission character register bank 525 having a left most byte position 526. Four stages in each bank hold a complete word every forth clock cycle inside the alignment mechanism 505. The four outputs of comma presence register bank 520 are input into a 4:1 comma presence multiplexer 530 and the four outputs of the transmission character register bank 525 are input into a 4:1 transmission character register bank multiplexer 535.

Control logic 540, synchronized by the clock enable 545 system synchronization pulse, checks to see whether a comma character is present in the four byte word and whether it is the left most byte 526. If the receiver 414 is not in synchronization and only one comma character is identified, the control logic 540 provides a data path select pulse 541 to latch onto the comma bank multiplexer 530 and the transmission character register bank multiplexer 535 to select and re-align the comma character within the register bank as the left most byte 526. If more than one comma character is present in the array, the control logic 540 will lock onto the last comma character that entered the array. The output of the transmission character register bank multiplexer 535 and a 10-bit mask generator 543 are coupled to a 2:1 multiplexer 545 for masking out invalid transmission characters to ensure that the receiver receives a stream of transmission characters 550 with comma characters arriving at regular intervals at the left most byte position.

The receiver 414 implements acquire-synchronization and a loss-of-synchronization procedures described in sections 12.1.2 and 12.1.3 of the 4.3 Fibre Channel standard. In accordance with the standard, the receiver 414 is in a synchronization state when at least three ordered sets have been received without receiving any intervening invalid transmission words. At this point, the comma character alignment mechanism 505 is disabled until the receiver enters a loss-of-synchronization state. Upon the detection of an invalid transmission character, the receiver 414 will begin an entry into the loss-of-synchronization state. In particular, if the control logic 540 detects comma characters arriving at a location other than as the left most byte 526, the control logic 540 will send a mask select signal to the mask generator 543 such that the invalid transmission character is replaced with a byte of either all zero entries or all one entries (which the receiver 414 cannot decode), depending on the current running disparity of the receiver 414. If a word contains one or more bytes of transmission characters that cannot be decoded, the receiver will consider that word as invalid. The detection of a second invalid transmission character within the next two or fewer consecutive characters drops the receiver 414 further towards the loss-of-synchronization state. On the other hand, detection of two valid transmission characters steps the receiver away from the loss-of-synchronization state. After dropping a total of four levels, the receiver 414 is still active, but in the loss-of-synchronization state such that the invention must again be employed to realign to the last comma character entering the register array.

While the present invention has been illustrated and described in connection with the preferred embodiment, it is not to be limited to the particular structure shown. It should be understood by those skilled in the art that various changes and modifications may be made within the purview of the appended claims without departing from the spirit and scope of the invention in its broader aspects.

We claim:

1. An apparatus for synchronization of an F_port receiver on a Fibre Channel switch with an N_port that transmits a stream of transmission characters including periodic four byte ordered sets that include a 10 bit comma character as the first byte, comprising:
   detection circuitry that detects the presence and position of a comma character within one of the four-byte ordered sets; and
   alignment circuitry that aligns the detected comma character such that it is positioned as the first byte in the four byte ordered set.

2. The apparatus for the synchronization of an F_port receiver as claimed in claim 1, the detection circuitry further comprising:
   a four stage transmission character register bank for storing transmission characters in four registers,
   a four stage comma presence register bank, each stage comprising a register and an output, wherein the comma presence register bank generates a one-bit flag in one of the four registers corresponding to the register in the transmission character register bank that contains a comma character.

3. The apparatus for the synchronization of an F_port receiver as claimed in claim 2, the alignment circuitry further comprising:
   a comma presence multiplexer that receives the four outputs of comma presence register bank,
   a transmission character register bank multiplexer that receives the four outputs of the transmission character register bank,
   control logic synchronized by a clock enable system synch pulse, wherein the control logic ascertains whether the detected comma character is located as the left most register in the transmission character register bank.

4. The apparatus for the synchronization of an F_port receiver as claimed in claim 3, wherein, if the receiver is not synchronized and only one comma character is identified, the control logic provides a datapath select pulse to latch onto the comma presence multiplexer and the transmission character register bank multiplexer to select the comma character within the transmission character register bank.

5. An apparatus for the synchronization of an F_port receiver on a Fibre Channel switch with an N_port that transmits a stream of transmission characters including periodic four byte ordered sets that include a 10 bit comma character as the first byte, comprising:
   detection circuitry that detects the presence and position of a comma character within one of the four-byte ordered sets, said detection circuitry comprising a four stage transmission character register bank for storing transmission characters in four registers and a four stage comma presence register bank that generates a one-bit flag in one of four registers corresponding to the register in the transmission character register bank that contains a comma character;
   alignment circuitry that aligns the detected comma character such that it is positioned as the first byte in the four byte ordered set;
   a comma presence multiplexor that receives the four outputs of the comma presence register bank;
   a transmission character register bank multiplexor that receives the four outputs of the transmission character register bank; and
   control logic synchronized by a clock enable system synch pulse, wherein the control logic ascertains whether the detected comma character is located as the left most register in the transmission character register bank, wherein, if more than one comma character is identified, the control logic locks onto the last comma character entering the transmission character register bank such that the receiver is synchronized and a stream of data arrives having comma characters at regular intervals.

6. The apparatus for the synchronization of an F_port receiver as claimed in claim 5, the control logic masking out misaligned comma characters by inserting a 10-bit character consisting of all zeros ("0000000000") that cannot be decoded by the receiver if a current running disparity is negative.

7. The apparatus for the synchronization of an F_port receiver as claimed in claim 5, the control logic masking out misaligned comma characters by inserting a 10-bit character consisting of all ones ("1111111111") that cannot be decoded by the receiver if a current running disparity is positive.

8. The apparatus for the synchronization of an F_port receiver as claimed in claim 6, wherein, if a word contains one or more bytes of data that cannot be decoded, the receiver will consider that word as invalid and take a step towards the out-of-synchronization state.

9. The apparatus for the synchronization of an F_port receiver as claimed in claim 8, wherein four stages are required in each bank to hold a four byte word at any one time inside the alignment circuitry.

10. A method for transmission character alignment in a Fibre Channel receiver in which a GLM/OLC transceiver provides a stream of transmission characters, comprising the method steps of:

grouping the incoming stream of transmission characters into four-byte words within a transmission character register bank, detecting comma characters within the transmission character register bank, aligning comma characters such that there is only one comma character and it occurs as the left most byte within the register bank, and in response to detecting excessive comma characters during the detecting step, masking out the excessive comma characters.

11. The method for transmission character alignment as claimed in claim 10, the step of detecting comma characters further comprising the steps of:

defining an order set as a four byte word having a comma character containing the seven bit sequence "0011111" or "1100000" as the left most (first) byte.

12. The method for data alignment as claimed in claim 11, wherein the receiver is synchronized when at least three ordered sets have been detected without having received any intervening invalid transmission words.

13. An apparatus for the synchronization of an F_port receiver on a Fibre Channel switch with an N_port that transmits a stream of transmission characters including periodic ordered sets that include a comma character in a specified position in the ordered set, comprising:

a transmission character register bank for storing transmission characters in registers;

a comma presence register bank that generates a one-bit flag in a register indicating one register in the transmission character register bank that contains a comma character;

alignment circuitry that aligns the detected comma character such that it is positioned in the specified position in the ordered set;

a comma presence multiplexor that receives the one-bit flag from the comma presence register bank;

a transmission character register bank multiplexor that receives the stored transmission characters from the transmission character register bank; and control logic synchronized by a clock enable system synch pulse, wherein the control logic ascertains whether the detected comma character is located in the specified position in the transmission character register bank, wherein, if more than one comma character is identified, the control logic positions the last comma character entering the transmission character register bank into the specified position such that the receiver is synchronized to the last comma character and a stream of data arrives having comma characters at regular intervals.

* * * * *